United States Patent
Amacker

(10) Patent No.: US 9,454,607 B1
(45) Date of Patent: Sep. 27, 2016

(54) IMAGE AS DATABASE

(75) Inventor: Matthew Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 164 days.

(21) Appl. No.: 12/965,603

(22) Filed: Dec. 10, 2010

(51) Int. Cl.
*G06F 7/00* (2006.01)
*G06F 17/00* (2006.01)
*G06F 17/30* (2006.01)

(52) U.S. Cl.
CPC ............................ *G06F 17/30864* (2013.01)

(58) Field of Classification Search
None
See application file for complete search history.

(56) References Cited

U.S. PATENT DOCUMENTS

| | | | | |
|---|---|---|---|---|
| 5,057,940 | A * | 10/1991 | Murakami et al. | 382/243 |
| 5,737,619 | A * | 4/1998 | Judson | 715/236 |
| 5,870,769 | A * | 2/1999 | Freund | 715/205 |
| 6,029,142 | A * | 2/2000 | Hill | 705/27.1 |
| 6,055,569 | A * | 4/2000 | O'Brien et al. | 709/223 |
| 6,067,565 | A * | 5/2000 | Horvitz | 709/218 |
| 6,125,352 | A * | 9/2000 | Franklin et al. | 705/26.8 |
| 6,281,874 | B1 * | 8/2001 | Sivan et al. | 345/660 |
| 6,301,576 | B1 * | 10/2001 | Wolfe | |
| 6,338,096 | B1 * | 1/2002 | Ukelson | 719/319 |
| 6,393,526 | B1 * | 5/2002 | Crow et al. | 711/137 |
| 6,397,213 | B1 * | 5/2002 | Cullen et al. | |
| 6,513,035 | B1 * | 1/2003 | Tanaka et al. | |
| 6,549,922 | B1 * | 4/2003 | Srivastava et al. | |
| 6,704,024 | B2 * | 3/2004 | Robotham et al. | 345/581 |
| 6,728,785 | B1 * | 4/2004 | Jungck | 709/247 |
| 7,007,237 | B1 * | 2/2006 | Sharpe | 715/764 |
| 7,050,629 | B2 * | 5/2006 | Jackson et al. | 382/173 |
| 7,398,464 | B1 * | 7/2008 | Wei et al. | 715/239 |
| 7,908,173 | B1 * | 3/2011 | Hill | 705/26.64 |
| 8,095,642 | B1 * | 1/2012 | Martin et al. | 709/224 |
| 2001/0011365 | A1 * | 8/2001 | Helfman | 717/1 |
| 2001/0031006 | A1 * | 10/2001 | Wang et al. | 375/240.16 |
| 2001/0051927 | A1 * | 12/2001 | London et al. | 705/51 |

(Continued)

FOREIGN PATENT DOCUMENTS

| | | | |
|---|---|---|---|
| WO | WO 0144988 | A1 * | 6/2001 |
| WO | WO 2006066613 | A1 * | 6/2006 |
| WO | WO 2006105158 | A2 * | 10/2006 |

OTHER PUBLICATIONS

Textual Image Compression: Two-Stage Lossy/Lossless Encoding of Textual Images, Witten et al. Proceedings of the IEEE, 82(6), pp. 878-888, Jun. 1994.*

(Continued)

*Primary Examiner* — Augustine K Obisesan
(74) *Attorney, Agent, or Firm* — Hogan Lovells US LLP

(57) ABSTRACT

A server generates an image with searchable information from a website and transmits that image to a client device. Since the image may be large, the image is generated and transmitted in the background as the client device browses the website. When the client device requests information from the website, the client device first checks if that information has already been transmitted to it in the image as encoded format. If the client device has this information, which is locally stored, then the client device decodes that portion of the image and retrieves the requested information without ever having to contact the server. If the client device does not have this information stored locally, then the client device contacts the server and retrieves the information. Since the image can contain all of the searchable information of a website, the searching process will become faster as time passes.

21 Claims, 8 Drawing Sheets

(56) References Cited

U.S. PATENT DOCUMENTS

| | | | |
|---|---|---|---|
| 2002/0007321 A1* | 1/2002 | Burton | 705/26 |
| 2002/0010655 A1* | 1/2002 | Kjallstrom | 705/27 |
| 2002/0021758 A1* | 2/2002 | Chui | 375/240.19 |
| 2002/0062396 A1* | 5/2002 | Kakei et al. | 709/246 |
| 2002/0099766 A1* | 7/2002 | Tuli | 709/203 |
| 2002/0165925 A1* | 11/2002 | Hamilton et al. | 709/213 |
| 2002/0178232 A1* | 11/2002 | Ferguson | 709/217 |
| 2002/0194227 A1* | 12/2002 | Day et al. | 707/523 |
| 2003/0023640 A1* | 1/2003 | Challenger et al. | 707/530 |
| 2003/0028673 A1* | 2/2003 | Lin et al. | 709/247 |
| 2003/0041258 A1* | 2/2003 | Wee et al. | 713/193 |
| 2003/0076542 A1* | 4/2003 | Holcomb | 358/452 |
| 2003/0110098 A1* | 6/2003 | Wirth, Jr. | 705/27 |
| 2003/0163444 A1* | 8/2003 | Kotzin | 707/1 |
| 2003/0197796 A1* | 10/2003 | Taubman | 348/272 |
| 2004/0012601 A1* | 1/2004 | Sang et al. | 345/581 |
| 2004/0059712 A1* | 3/2004 | Dean et al. | 707/1 |
| 2004/0064588 A1* | 4/2004 | Jungck | 709/247 |
| 2004/0143683 A1* | 7/2004 | Greenwood | 709/250 |
| 2005/0033728 A1* | 2/2005 | James et al. | 707/1 |
| 2005/0271281 A1* | 12/2005 | Simard et al. | 382/225 |
| 2005/0273723 A1* | 12/2005 | Sharpe | 715/764 |
| 2005/0289535 A1* | 12/2005 | Murray | G06F 8/61 717/172 |
| 2006/0092835 A1* | 5/2006 | Lee | 370/229 |
| 2007/0106817 A1* | 5/2007 | Buckley et al. | 709/247 |
| 2007/0162842 A1* | 7/2007 | Ambachtsheer et al. | 715/513 |
| 2007/0189578 A1* | 8/2007 | Torrubia | 382/100 |
| 2007/0189579 A1* | 8/2007 | Crookham et al. | 382/100 |
| 2008/0018658 A1* | 1/2008 | Bruno et al. | 345/581 |
| 2008/0130043 A1* | 6/2008 | Lunetta et al. | 358/1.15 |
| 2008/0168525 A1* | 7/2008 | Heller et al. | 725/139 |
| 2008/0195698 A1* | 8/2008 | Stefanovic et al. | 709/203 |
| 2008/0235083 A2* | 9/2008 | Bosarge et al. | 705/14 |
| 2009/0074307 A1* | 3/2009 | Lu et al. | 382/232 |
| 2009/0089448 A1* | 4/2009 | Sze | G06F 9/4443 709/231 |
| 2009/0100488 A1* | 4/2009 | Sakamoto | H04H 60/82 725/112 |
| 2009/0220154 A1* | 9/2009 | Daidoh | 382/182 |
| 2009/0249194 A1* | 10/2009 | Day | 715/239 |
| 2009/0252431 A1* | 10/2009 | Lu et al. | 382/255 |
| 2010/0198805 A1* | 8/2010 | Choi et al. | 707/711 |
| 2012/0089899 A1* | 4/2012 | Palaima et al. | 715/234 |

OTHER PUBLICATIONS

Compressed SVG Representation of Raster Images Vectorized by DDT Triangulation, Battiato et al, Eurographics Italian Chapter meeting, 2006.*

* cited by examiner

IMAGE AS DATABASE

BACKGROUND

Networks such as the Internet are used more everyday as a way of communicating and doing business. Users use client devices such as computers, laptops, mobile terminals, personal digital assistants, hand held devices, and similar devices to access the Internet and communicate with others and conduct business. Most of these client devices, which communicate via the Internet, run software that includes graphical user interfaces which allow the user to make selections and navigate through the Internet. Most of these graphical user interfaces run browser programs that allow the user to connect to websites housed on servers and to navigate those websites. When a user logs on to a website using a client device, the user browses or navigates through that website by sending requests to the website asking for certain information to be retrieved. For example, if a user logs on to a website selling goods, the user may request the website to provide details about digital cameras costing between $100 and $300. Completing these requests takes time because the user's computer first has to send the request through a network (internet) to the server, the server has to then search its database, retrieve the requested information and send the requested information back to the user's computer via the network (internet) again. There is further overhead in the amount of time that is spent because the data, which is in text format, is processed by the browser both when the data is sent and when the data is received.

This process of requesting and retrieving information from a website has been made more efficient over time by minimizing the amount of time that the user using a client device spends communicating with the server. For example, Java screen and javascripts with Ajax have been used to minimize the amount of time that is spent communicating between the client device and the server by fetching data before the data is actually needed. However, these techniques also have problems associated with them because a significant amount of time and resources are spent processing and interpreting data that has been pre-fetched but that may never be needed.

Some websites, such as merchant websites that offer many items for sale, can include large volumes of searchable data. Browsing these websites can be time consuming because the user is frequently searching for different items with different features. Every time a new search is desired, the user must either communicate with the server requesting information or must wait for the user's computer to process large amounts of data that may not be on point for the search conducted. These potential long waiting times for receiving requested information can be frustrating to a user, especially when the user is frequently modifying the search parameters, which can result in lost sales and less repeat business.

BRIEF DESCRIPTION OF THE DRAWINGS

A further understanding of the nature and advantages of the disclosure may be realized by reference to the remaining portions of the specification and the drawings, presented below. The figures are incorporated into the detailed description portion of the disclosure.

DETAILED DESCRIPTION

Figure 1:
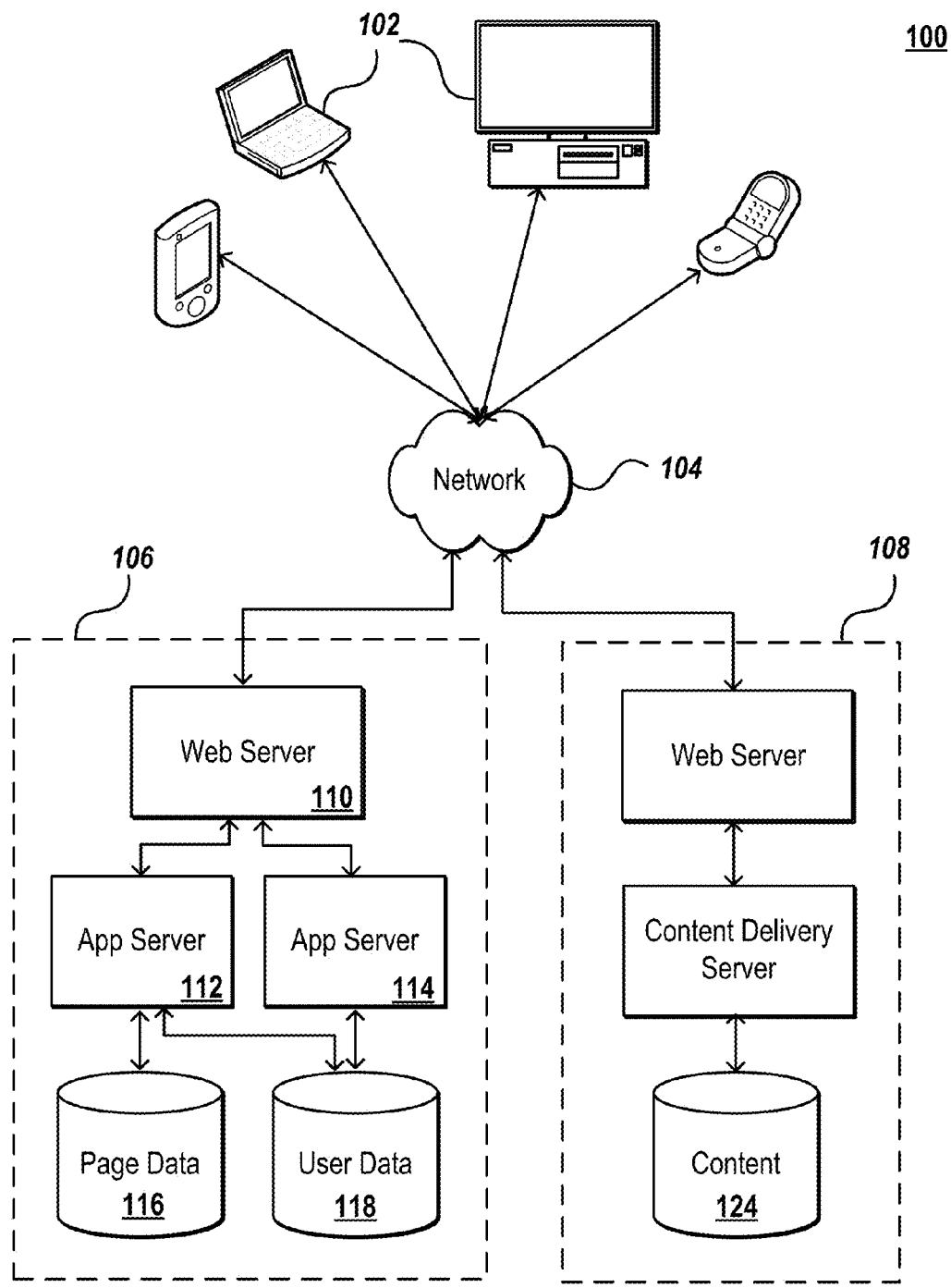
FIG. 1 is a simplified diagram of a network in which a server communicates with various client devices, in accordance with embodiments.

In the following description, for the purposes of explanation, specific details are set forth in order to provide a thorough understanding of the disclosure. However, it will be apparent that the disclosure may be practiced without these specific details.

Embodiments provide systems and methods used by servers, client devices, and other such systems or components to efficiently search content, such as content offered through one or more websites. When a client device accesses a source of content such as a website running on a server, for example, the server in at least some embodiments will generate at least one image with searchable information from the website and transmit that image to the client device. Since the image may be large, the image in at least some embodiments is generated and transmitted in the background as the client device browses, or otherwise navigates, the website. When the client device requests information from the website, the client device first checks if that information has already been transmitted to the client device in the image as an encoded format. If the client device has this information locally stored, the client device can decode that portion of the image and retrieve the requested information without having to contact the server again for that information. This allows for very fast and efficient surfing or searching of content on a website or other such grouping of content. If the client device does not have this information stored locally, then the client device can contact the server (or another appropriate source of content) and retrieve the information. Since each image can contain some or all of the searchable information of a website, the searching process will become faster as time passes because more of the image will have been transmitted to the client device since this process runs in the background. Once the entire image has been transmitted to the client device, searching the website will be very efficient because all of the searchable information will be available locally to the client device and the client device will not have to retrieve information from the server, at least until such time as more information and/or a newer version of the image becomes available.

As an example, if the website is a vendor that sells merchandise over the internet, then the document that is encoded into an image by the server can be the vendor's entire catalog of merchandise. Once the image has been completely transmitted to the client device, searching the catalog will be very fast because the client device will no longer have to communicate over the internet with the server to retrieve catalog related information.

Embodiments also include systems and methods operating on a server or other such computing device that encode information into an image having pixels, break up the image into a set of image segments, and transmit the image segments (or subimages) to a client dynamically as the client browses the server. If a request from a client to retrieve requested information is received by the server while the image is being segmented and transmitted to the client, the server can transmit the specific requested information to the client immediately without stopping the process of segmenting and transmitting the image. Transmitting the image segments (or subimages) dynamically can be done as part of the background process independent of the client device. The image segments (or subimages) are in a non-text format and are transmitted dynamically in the background until all of image segments (or subimages) needed to complete the image have been transmitted. The image segments (or subimages) can further be transmitted to the client automatically without receiving a request from the client device. Patches, which are updates to the image, can also be transmitted to the client device. Encoding information into an image can include encoding a document into the image and the document can be a complete catalog.

Embodiments further include systems and methods operating on a client device that access a source of content such as a server, receive image segments (or subimages) from the server, generate a data set having pixels using the received image segments (or subimages), wherein the data set is a partial data set until the data set is completely generated and becomes a finished data set. The systems and methods further receive an input at a first time to retrieve requested information and determine if the requested information is included in the data set generated at the first time, independently of whether the data set is the partial data set or the data set is the finished data set. If the requested information is included in the data set, then pixels from an image encoding the data set, which include the requested information, are retrieved and decoded to generate the requested information. If the requested information is not included in the data set, then a request is sent to a server to send the requested information. The plurality of image segments (or subimages) are received dynamically in the background until all of the image segments (or subimages) needed to form the finished data set have been received and the data set is generated dynamically in the background using the received image segments (or subimages) until the finished data set is generated. Receiving image segments (or subimages) dynamically and generating the data set dynamically is done as part of the background process. The input is also received independently of whether all the image segments (or subimages) needed to generate the data set are received and independently of whether the data set is the partial data set or the finished data set. An index of the retrieved pixels can also be generated.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes a variety of electronic client devices 102, which can include any appropriate device operable to send and receive inputs, messages, or information over an appropriate network 104 and convey information back to a user of the device. Examples of such client devices include personal computers, cell phones, hand held messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 104.

The network 104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 106 and a supplemental content provider 108. Each provider can include at least one Web server 106 for receiving inputs from a user device 102 and serving content in response thereto, although for other networks an alternative device serving a similar purpose could be used as would be apparent to one of ordinary skill in the art.

Each content provider in this illustrative environment includes at least one application server 112, 114, 122 or other such server in communication with at least one data store 116, 118, 124. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all inputs and responses, as well as the delivery of content between the client device 102 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 116 illustrated includes mechanisms for storing page data useful for generating Web pages and the user information data store 118 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 102. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2A:
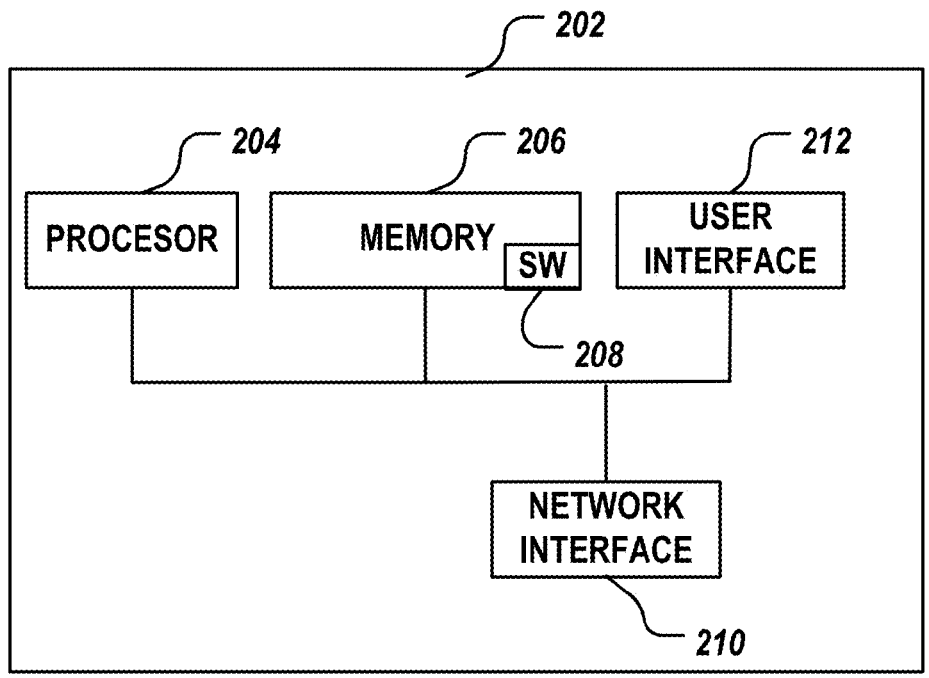
FIG. 2A is a block diagram illustrating components of the client device shown in FIG. 1.

FIG. 2A is block diagram illustrating a device 202, which is an example of a client device 102. The device 202 includes a processor 204, memory 206, software (SW) 208, network interface 210 and user interface 212. The device 202 sends and receives inputs, messages, or information over a network 104. Some examples of the device 202 include personal computers, cell phones, smart phones, hand held messaging devices, laptop computers, net books, personal data assistants, electronic book readers, and the like. In some cases, all the functionality for the interface will be generated on the device. In other embodiments, at least some of the functionality or content will be generated in response to instructions or information received from over at least one network 104. The processor 204 is preferably an intelligent hardware device, e.g., a central processing unit (CPU), a microcontroller, an application specific integrated circuit (ASIC), etc. The memory 206 can include random access memory (RAM), read-only memory (ROM), solid state devices, hard drives, and the like. The memory 206 stores computer-readable, computer-executable software code 208 containing instructions that are configured to, when executed, cause the processor 204 to perform various functions described herein. Alternatively, the software 208 may not be directly executable by the processor 204 but is configured to cause the device 202, e.g., when compiled and executed, to perform the functions. The network interface 210 is coupled to the processor 204 and the memory 206 and is used by the device 202 to interact with the network 104. The network interface 210 can include internet connections as well as intranet connections and is the primary way that device 202 interacts with the network 104. The network interface 214 can include connections for both wire and wireless connections. The user interface 212 is coupled to the processor 204 and the memory 206 and is used by a user to enter or retrieve information from the device 202. The user interface 212 can include a keyboard, mouse, display, touch interface display, speaker, microphone, or the like. The user interface 212 is the primary way that the user interacts with device 202, both when inputting and receiving data.

Figure 2B:
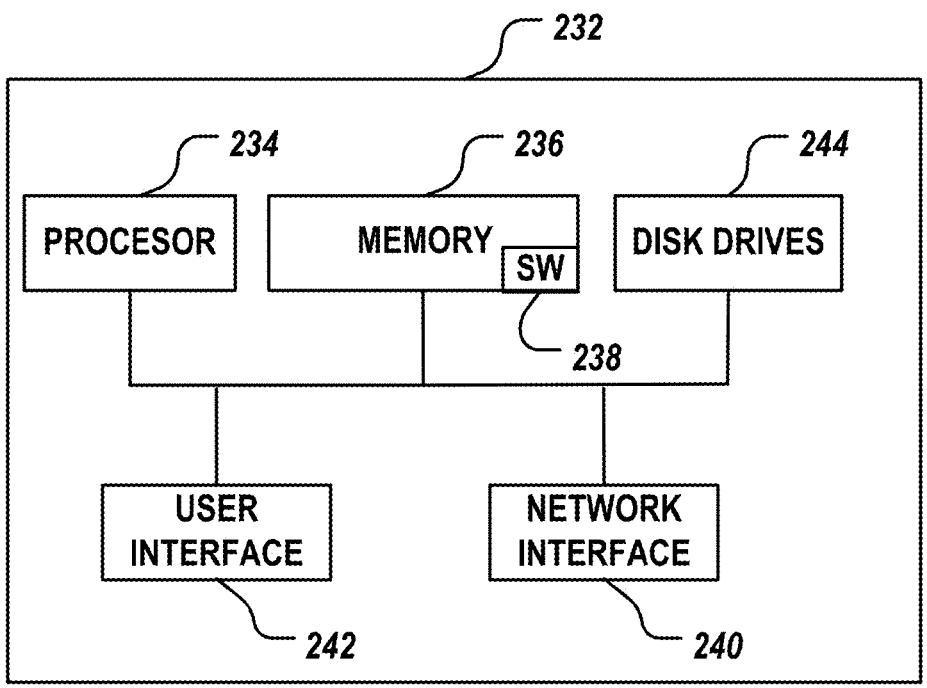
FIG. 2B is a block diagram illustrating components of the server shown in FIG. 1.

FIG. 2B is block diagram illustrating a server 232, which interacts with client devices 102 (as well with client device 202) via the network 104. The server 232 includes a processor 234, memory 236, software (SW) 238, network interface 240, user interface 242, and disk drives 244. The server 232 sends and receives inputs, messages, or information over a network 104, usually in response to a request from a client device 202. The processor 234 is preferably an intelligent hardware device, e.g., a central processing unit (CPU), a microcontroller, an application specific integrated circuit (ASIC), etc. The memory 236 is used to store any kind of information including short term data. The memory 236 can include random access memory (RAM), read-only memory (ROM), solid state devices, and the like. The memory 236 stores computer-readable, computer-executable software code 238 containing instructions that are configured to, when executed, cause the processor 234 to perform various functions described herein. The software can include interpreted language, such as javascript, which is not compiled, and/or non-interpreted language, which is compiled. Alternatively, the software 238 may not be directly executable by the processor 234 but is configured to cause the server 232, e.g., when compiled and executed, to perform the functions. The network interface 240 is coupled to the processor 234 and the memory 236 and is used by the server 232 to interact with the network 104. The network interface 240 can include internet connections as well as intranet connections and is the primary way that server 232 interacts with the network 104 and with users requesting data via client devices 202. The network interface 240 can include connections for both wire and wireless connections. The user interface 242 is coupled to the processor 234 and the memory 236 and is used by a user to enter or retrieve information from the server 232. The user interface 242 can include a keyboard, mouse, display, touch interface display, speaker, microphone, or the like. The user interface 242 is the primary way that that server administrators interacts with server 232, both when inputting and receiving data. Disk drives 244 are the primary storage medium used by server 232 to store large amounts of information. However, large amounts of information can also be stored in other storage devices such as optical devices, solid state drives, etc. Disk drives 244 is intended to include other data storage devices and is not limited to only hard disk drives. For example, disk drives 244 can store product information, which is normally found in merchandise catalogs. Product information can be used by consumers to research and order products and can include product descriptions, product reviews, pricing, warranty information, etc. Disk drives 244 can also be used to store information and media data that is purchased such as music, movies, books, magazine, newspaper and journal contents, etc. When server 232 receives a request from a client device 202 via the network 104, the processor 234 processes the request using information stored in memory 236 and instructions stored in SW 238. Once the request is processed, data is retrieved from disk drive 244 and transmitted to the client device 202 via the network interface 240 and the network 104.

In some embodiments, when a client device 202 is connected to the server 232 and a user is browsing the contents of disk drives 244, the processor 234 automatically and dynamically prepares and sends information to the client device 202, which will be useful to the client device. Dynamically preparing and sending information to the client device 202 is done as part of the background process independent of the content rendered on the client device 202. For example, if a user is browsing a catalog of items for sale on the server 232 using the client device 202, the processor 234 may automatically download to the client device 202 information from the catalog that the user is likely to use. In one embodiment, the server 232 pushes the entire content of a catalog onto the client device 202 because once all of the information from the catalog is on the client's device 202, the user will be able to search the contents of the catalog much faster by only having to retrieve information that is already stored on the client device 202 rather than having to request information over a network.

Before the information is pushed onto the client device 202, the information is encoded into an image having pixels. After the information is converted into an image, portions of the image are transmitted to the client device 202 dynamically as the user browses the website, which is housed on the server 232, using the client device 202. Portions of the image can be transmitted to the client device 202 by forming a plurality of subimages, each of which represent a portion of the entire image, and transmitting those subimages to the client. The subimages, which are in a non-text format, are transmitted dynamically in the background until all of the subimages needed to complete the image originally generated using the information have been transmitted, as further discussed with reference to FIGS. 3A-3C and 4. With this technique large data sets can be sent to the user's browser very efficiently through images. Since information is sent as an image, which is a non-text format, the browser running on the client device 202 will not interpret the information encoded in the image. Further, the client device 202 will pull into memory 206 information encoded in the image when it is requested by javascript. Also, the information that is sent via an image can be stored in the browsers image cache located in memory 206, which can include random access memory (RAM), read-only memory (ROM), solid state devices, hard drives, and the like. Since the image data is transmitted dynamically, the data is lazy-loaded and lazy-updated as the user continues to browse through a website using server 232. Later, when the user requests specific information, the javascript requests the browser to return a set of pixels from the image and decodes the binary data held within those pixels into object that the javascript heap can then work from, as further discussed with reference to FIG. 5.

In other embodiments large images can be broken up and loaded in batches as a user traverses a site, as further discussed with reference to FIG. 3D-3E. The images which are generated and pushed onto the client device 202 can also reference other images that have been downloaded onto the client device 202. Further, images can be updated or "patched" with subsequent patch images to prevent constantly updating and changing the larger image. Updates occur when the server 232 determines that data, which has been previously transmitted to the client device 202, is stale (e.g., not sufficiently current) and should be replaced. For example, if the inventory of an item listed on a merchant's catalog has changed, then the previously transmitted data may no longer be accurate and the server 232 could determine that this data is stale and should be updated to reflect the current inventory. Updates can be performed by transmitting a patch from the server 232 to the client device 202. For example, in images such as those described with reference to FIGS. 3A-3G, a patch may be 1 Kbyte in size and contain instructions to change a few hundred pixels of the image (e.g. replace pixels 300-500 in FIG. 3A). In some embodiments, a javascript is used to request updates. In other embodiments, a javascript is set up to review a client device when it revisits a website and checks for updates. In other embodiments, the javascript generates script tags on the client device 202 to retrieve updates and cache them. In other embodiments, a VBscript is used instead of a javascript. In another embodiment, the server 232 rendering page updates and includes script tags on the page for all clients.

The entire contents of a catalog or group of information can be encoded into an image and that image pushed onto the client's device 202. For example, an image can include the entire catalog of products sold by any vendor or supplier such as Sears®, Home Depot®, Wal-Mart®, Target® or the like. When a user begins browsing the website of any vendor or supplier, the processor running on the server 232 begins downloading the image which represents its entire catalog. The image can be prepared as one image or as segments of images which can be downloaded in any order. The longer the user browses the website the more of the image will have been downloaded so that the user will receive results faster and faster until the entire image is downloaded. Once the entire image is downloaded, the user will be able to browse the contents of the vendor's or supplier's catalog very fast because all of the information regarding the catalog will be stored on the client device 202 and the client device will not have to retrieve the information from the server 202 via the network 104 every time the user wishes to see a different part of the catalog. Instead the client device 202 will retrieve and decode pixels from the image which has already been downloaded and is local.

In another embodiment, an image is generated every time a search is done and a large number of results are found as "extra" in the execution of the search. Those "extra" results are encoded in an image, which can be a compact image, and transmitted to the client device 202, which would allow the user to get to those other results efficiently.

In some embodiments, a "sense" is applied to the images, which allows a user to scan the images by moving a pointer such as mouse over the images. As the user scans the images by scrolling over them with a mouse, the user is able to react to the images by for example choosing and buying the product represented by the image.

Figure 3A:
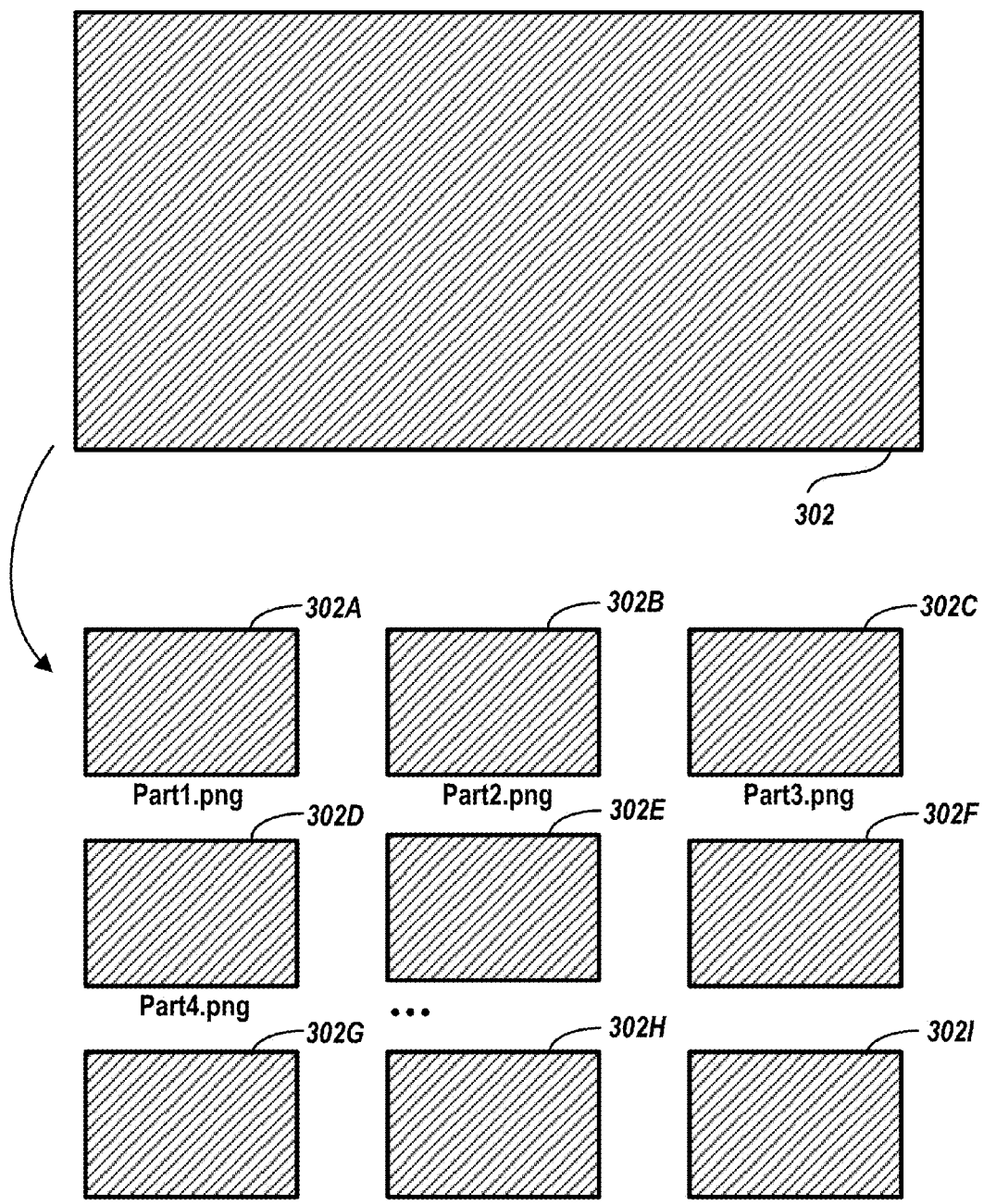
FIG. 3A is an illustration showing how an image encoded with information is parsed into several parts so that each part can be transmitted individually and later recombined to form the image.

FIG. 3A illustrates an example of how image 302, which has been generated with encoded information, is parsed into smaller images 302A . . . 302I, in accordance with an embodiment of the invention. In this illustration, a vendor's entire catalog has been encoded into an image 302. The size of the image 302 can vary depending on the amount of information that is stored and the size of the vendor's catalog. In some examples, the size of the image can vary from 0.5 mega pixels to 20 mega pixels. Image 302 can be generated so that items in the catalog are grouped together according to some organization, as discussed in further detail below with reference to FIGS. 3B-3G. For example, information regarding cameras can be grouped together, information regarding women's shoes can be grouped together, etc.

Image 302 is parsed or broken up into segments 302A-302I, at the server 232 to facilitate downloading image 302 to the client device 202. Each segment 302A-302I is provided with a name. In this example, segments 302A-302I are named Part1.png, Part2.png . . . PartN.png, respectively, where N is the number of segments that the image 302 is parsed into. In the example illustrated, image 302 and segments 302A-302I are Portable Network Graphics (.png) images, which are in bitmapped image format that employs lossless data compression. The invention is not limited to images formatted in this particular .png format and can be implemented using other formats such as in the Graphics Interchange Format (GIF) and Multiple-image Network Graphics (MNG) formats. Image 302 can be parsed into segments according to different criteria. For example, in one embodiment the first image segment 302A named Part1.png can include items from a merchant's catalog starting with the letter "a", the second image segment 302B, named Part2.png can include items from a merchant's catalog starting with the letter "b", and so on. In this embodiment a search of the merchant's catalog for items starting with letter "a" is performed in order to generate the first image segment 302A named Part1.png. Similar searches are performed to generate the other image segments 302B-302I. After the image 302 is parsed into segments 302A-302I, the segments are transmitted to the client device.

Figure 3B:
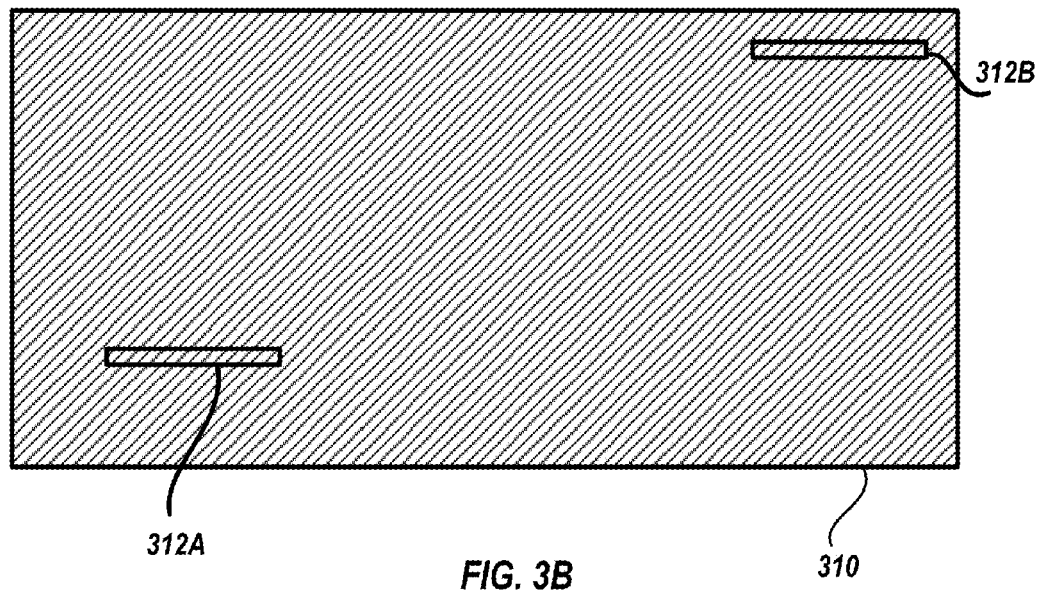
FIG. 3B is an illustration of an image that has been generated at the server with encoded information.

FIG. 3B is an illustration of an example image 310 that has been generated with encoded information in accordance with one embodiment. In this illustration, a vendor's entire catalog has been encoded into an image 310. The size of the image 310 can vary depending on the amount of information that is stored and the size of the vendor's catalog. In some examples, the size of the image can vary from 0.5 mega pixels to 20 mega pixels. Image 310 can be generated so that items in the catalog are grouped together according to some organization. For example, information regarding cameras can be grouped together, information regarding women's shoes can be grouped together, etc. In FIG. 3B, information regarding cameras is grouped together in the first group of pixels 312A. Other groups of pixels such as 312B can include information regarding other items such as women's shoes.

Figure 3C:
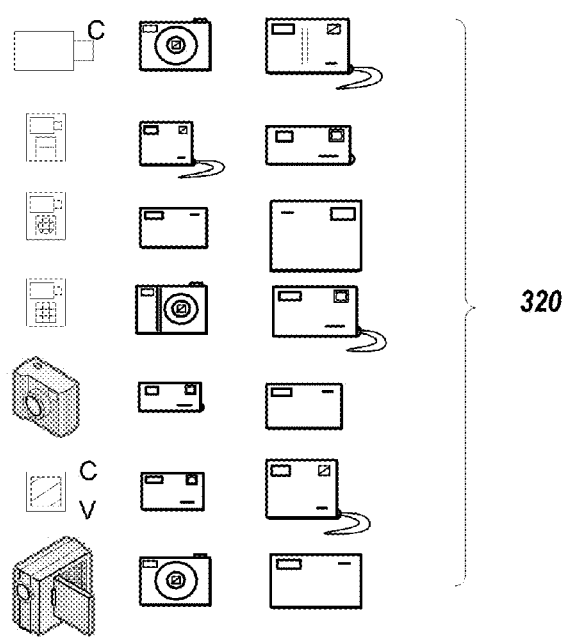
FIG. 3C is an illustration showing the information stored in a group of pixels of the image illustrated in FIG. 3B.

FIG. 3C is an illustration showing the information stored in the first group of pixels 312A in FIG. 3B. The first group of pixels 312A includes encoded information about the cameras which a vendor offers for sale in the vendor's catalog. When the first group of pixels 312A are retrieved and decoded by a processor running on a client device 202, images of the cameras 320, along with their information, are made available to the user. In this example, the vendor offers twenty-one cameras 320 for sale and the first group of pixels 312A includes all of the information needed to provide a user with the same information that the user would get if the user were looking at the vendor's catalog. For example, the user would have images of the camera, sales price, camera descriptions, camera reviews, warranty information, availability, etc.

Figure 3D:
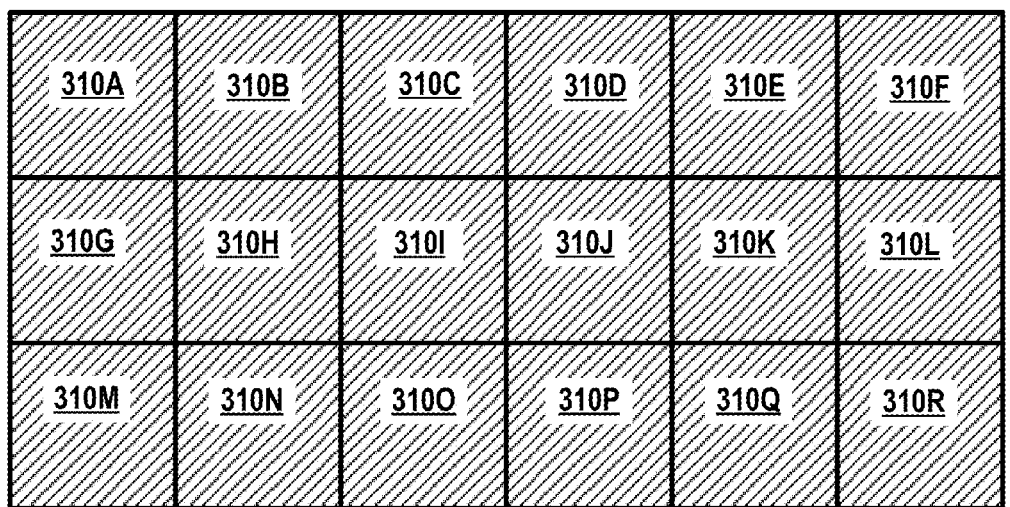
FIG. 3D is an illustration of the image in FIG. 3B broken down into image segments.

FIG. 3D is an illustration of the image 310 that has been generated with encoded information and has been broken down or parsed into segments. In this example, the image 310 has been broken down into eighteen segments 310A-310R. In one embodiment the image 310 is broken up into segments at the server 232 to assist in the download of the image to the client device 202. Once the image is broken up into segments 310A-310R, the segments are transmitted to the client device. When segments are transmitted they can be transmitted according to this segmentation. In one embodiment, all the data in a segment is transmitted before data corresponding to a different segment begins transmission. Since image 310 can be segmented according to some intelligence, in this embodiment all relevant data is transmitted before the next set of data is transmitted. For example, if image 310 includes encoded information for a vendor's entire catalog, then the image segment 310A-310R can be set up so that each image segment includes information for a specific category. As an example, segments can be set up so that individual segments are dedicated to individual categories such as electronics, women's clothing, men's clothing, women's shoes, men's shoes, jewelry, furniture, auto parts, sporting goods, etc. By segmenting the image 310 in this manner and having an entire segment downloaded before the next segment begins downloading, all of the information available to a user in the catalog would be available for a particular category. If a user is searching under sporting goods, the user would benefit from having all of the information downloaded for sporting goods rather than only some of that information along with information about other categories such as women's shoes. The user would benefit because the user is likely to search within a single category before moving onto searching under a different category.

Figure 3E:
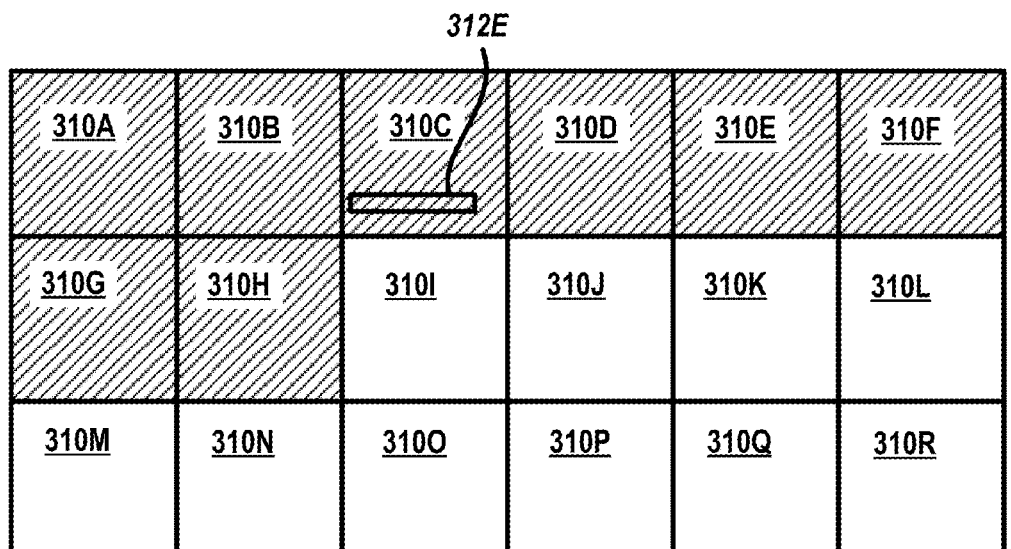
FIG. 3E illustrates a situation where only some image segments have been transmitted from the server to the client and the user has requested information that is encoded in an image segment that has already been transmitted from the server to the client.

FIG. 3E is an illustration of an example image 310 in accordance with one embodiment that has been generated with encoded information and has been broken down into segments 310A-310R and only segments 310A-310H have yet been downloaded to the client device 202. The user has requested information encoded in pixels 312E disposed in an image segment 310C, which has already been transmitted from the server to the client. In this illustration, the downloading process from the server 232 to the client device 202 is done sequentially and in order. Specifically, image segment 310A is downloaded first, then the image segment 310B is downloaded and so on. In this illustration a user has requested to see information from the vendor's catalog that has been stored in image segment 310C and specifically information that has been encoded in the pixel group 312E. Since this information has already been delivered to the client device 202, the client device can retrieve these pixels using a javascript and decode them using processor 204 to quickly display the results for a user. There is no need to request the information from the server 232, which causes the results to be displayed very quickly. In this situation the user believes that he is conducting a search over the network and that the results are being delivered by the merchant very quickly, which ends up being a very pleasant browsing experience.

Figure 3F:
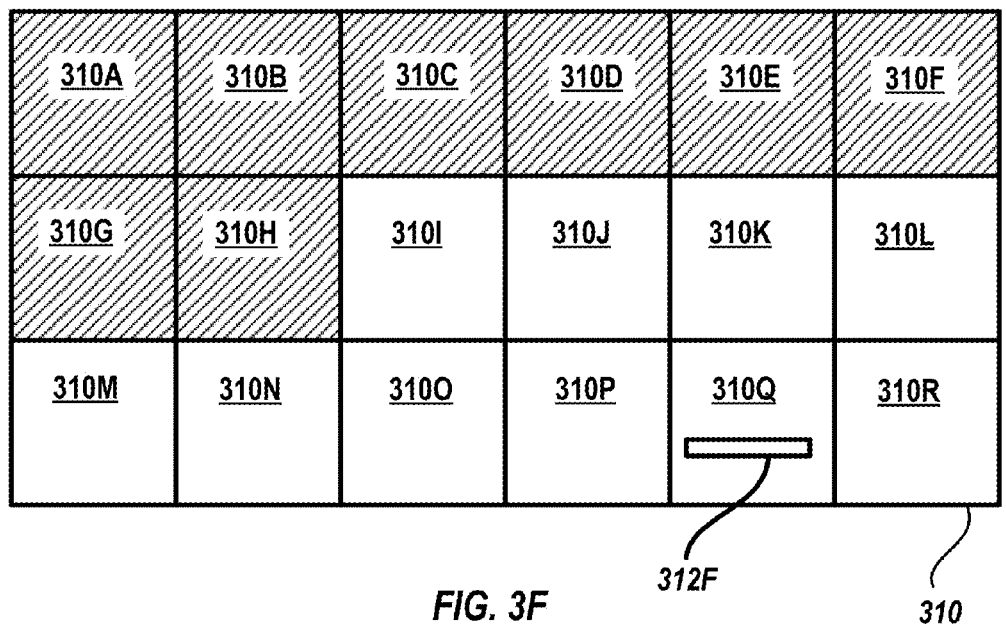
FIG. 3F illustrates a situation where only some image segments have been transmitted from the server to the client and the user has requested information that is encoded in an image segment that has not been transmitted from the server to the client.

FIG. 3F is somewhat similar to FIG. 3E, except that the user has requested to view information from the vendor's catalog that has been encoded in pixel group 312F disposed in image segment 310Q, which has not yet been transmitted from the server 232 to the client device 202. In FIG. 3F, an image 310 that has been generated with encoded information and has been broken down into segments 310A-310R but only segments 310A-310H have been downloaded to the client device 202 at the time that the user requests the information. This situation occurs when the image 310 is large and the user begins browsing the website before the completed image 310 is transmitted to the client device 202. If the user remains on the website long enough, the entire complete image 310 will eventually be transmitted to the client device 202, and this scenario will not occur. Since the information requested by the user has not yet been delivered to the client device 202, the client device 202 sends a request to the server 232 to transmit the information requested by the user. Since the request and information must all be transmitted through the network 104 and processed by the server 232, retrieving the information associated with pixel group 312F will take longer than retrieving the information associated with pixel group 312E, as shown in FIG. 3E.

Figure 3G:
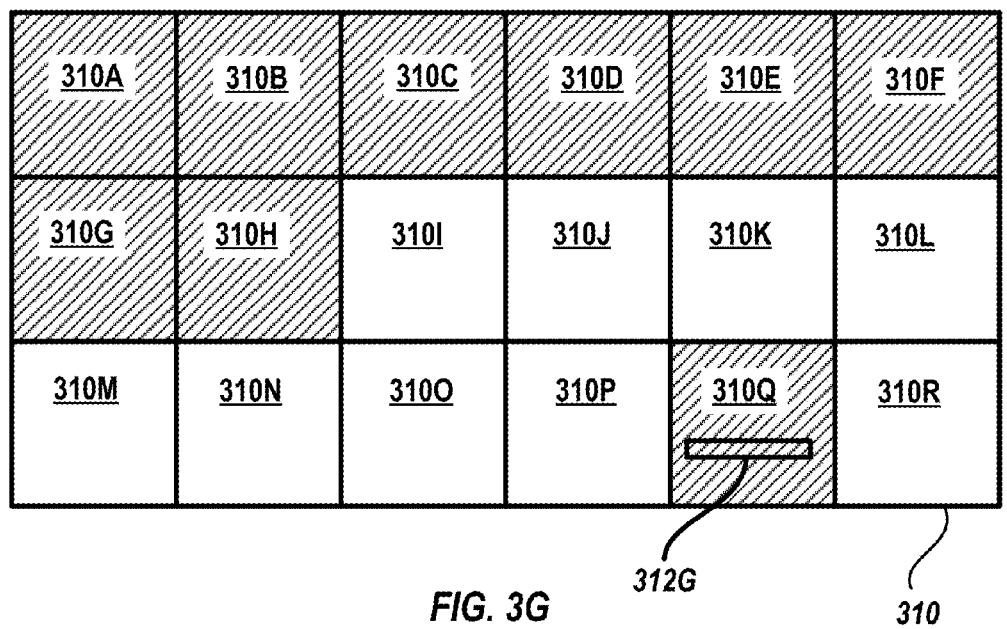
FIG. 3G illustrates a situation where image segments have been transmitted out of sequence from the server to the client in response to a request for information that is encoded in an image segment that has not been transmitted from the server to the client.

FIG. 3G illustrates a response to a request for information that has yet to be transmitted from the server 232 to the client device 202. After the server 232 receives a request to transmit the information associated with pixels 312G, the server can transmit pixels 312G along with the rest of segment 310Q to the client 202. Since the image 310 has already been segmented with some intelligence, many of the items that a user will continue to search are probably similar to the items previously searched so transmitting the image segment 310Q to the client device 202 would likely benefit the user by improving the time it takes for future searches to be done.

Figure 4:
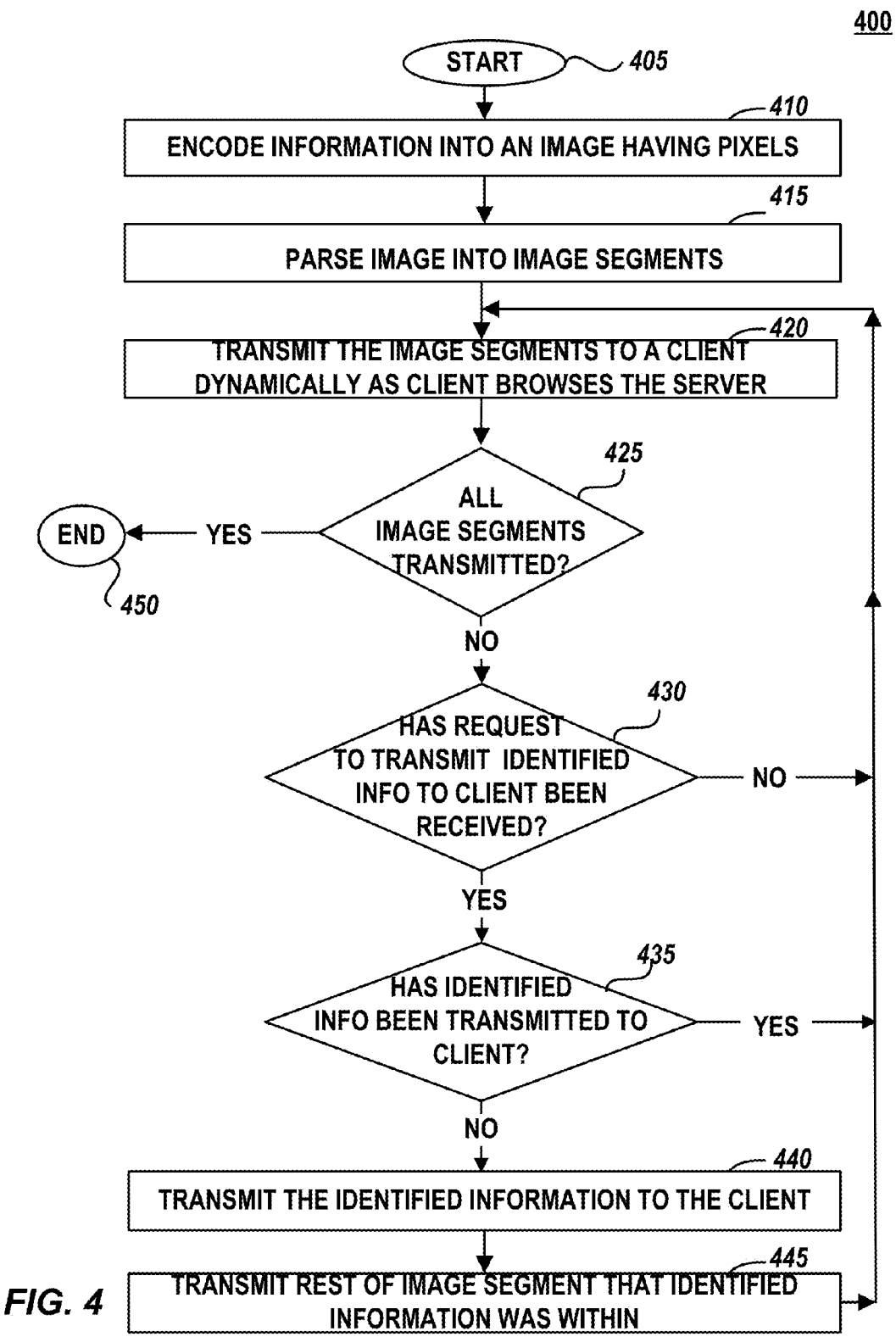
FIG. 4 is a flowchart illustrating operations used by a server to generate an image with information from a document that has been encoded, in accordance with an embodiment.

FIG. 4 is a flowchart illustrating a process 400 used by a server 232 to generate an image 310 with information from a document that has been encoded, in accordance with an embodiment. The process 400 begins in operation 405 where the server 232 is initialized by starting and preparing the server 232 to receive requests and transmit data over the network 104. In some embodiments, operation 405 is optional and the process starts in operation 410. Operation 405 can be optional if the server 232 is already running and all the necessary logging on has been performed. In operation 410, the server 232 encodes information associated with a document and generates an image having pixels representing the document. In some embodiments, the document is a vendor's or supplier's complete catalog. In operation 415, the server 232 parses the image into smaller image segments 310A-310R. The smaller image segments can be selected so that information from the document is grouped together intelligently.

Next in operation 420, the image segments (or subimages) are transmitted to the client device 202 dynamically as the client device is used to browse the website. While the server 232 is generating and transmitting image segments (or subimages) associated with the document, which includes encoded information, server 232 awaits to receive a request for information related to the website. In some embodiments the image segments (or subimages) are pre-generated and the server only transmits those image segments (or subimages) in operation 420. Since the image segments are transmitted dynamically in the background until all of the image segments (subimages) needed to complete the image have been transmitted from the server 232 to the client device 202, the server 232 might receive requests to transmit information from the client device 202 because the client device 202 may not have the information being requested by the user.

In operation 425, a decision is made whether all the image segments generated from the parsed image have been transmitted from the server 232 to the client device 202. If the decision in operation 425 is that all the image segments have been transmitted to the client device 202 then the method ends in operation 450 because the client device 202 has a complete data set. If the decision in operation 425 is that all the image segments have not been transmitted to the client device 202, then in operation 430 another decision is made whether the server 232 has received a request to transmit identified information to the client device 202. If the decision in operation 430 is that the server 232 has not received a request to transmit identified information to the client device 202, then the method loops back to operation 420 when the server 232 continues to transmit image segments to the client device 202 dynamically as the client device is used to browse the website. If the decision in operation 430 is that the server 232 has received a request to transmit identified information to the client device 202, then in operation 435 another decision is made whether the server 232 has transmitted the requested identified information to the client device 202. If the decision in operation 435 is that the server 232 has transmitted the requested identified information to the client device 202, then the method loops back to operation 420 when the server 232 continues to transmit image segments to the client device 202 dynamically as the client device is used to browse the website. If the decision in operation 435 is that the server 232 has not transmitted the requested identified information to the client device 202, then in operation 440 the requested identified information is transmitted to the client device 202. Next in operation 445, the server 232 transmits the rest of the image segment that the identified information was within. After operation 445, the method loops back to operation 420 when the server 232 continues to transmit image segments to the client device 202 dynamically as the client device is used to browse the website. The method ends in operation 450 after all the image segments have been transmitted to the client device 202, because the client device 202 does not need to request any more information from the server 232 since it has all of the information that the server 232 would transmit directly available to it locally on the image 310 it has saved.

Figure 5:
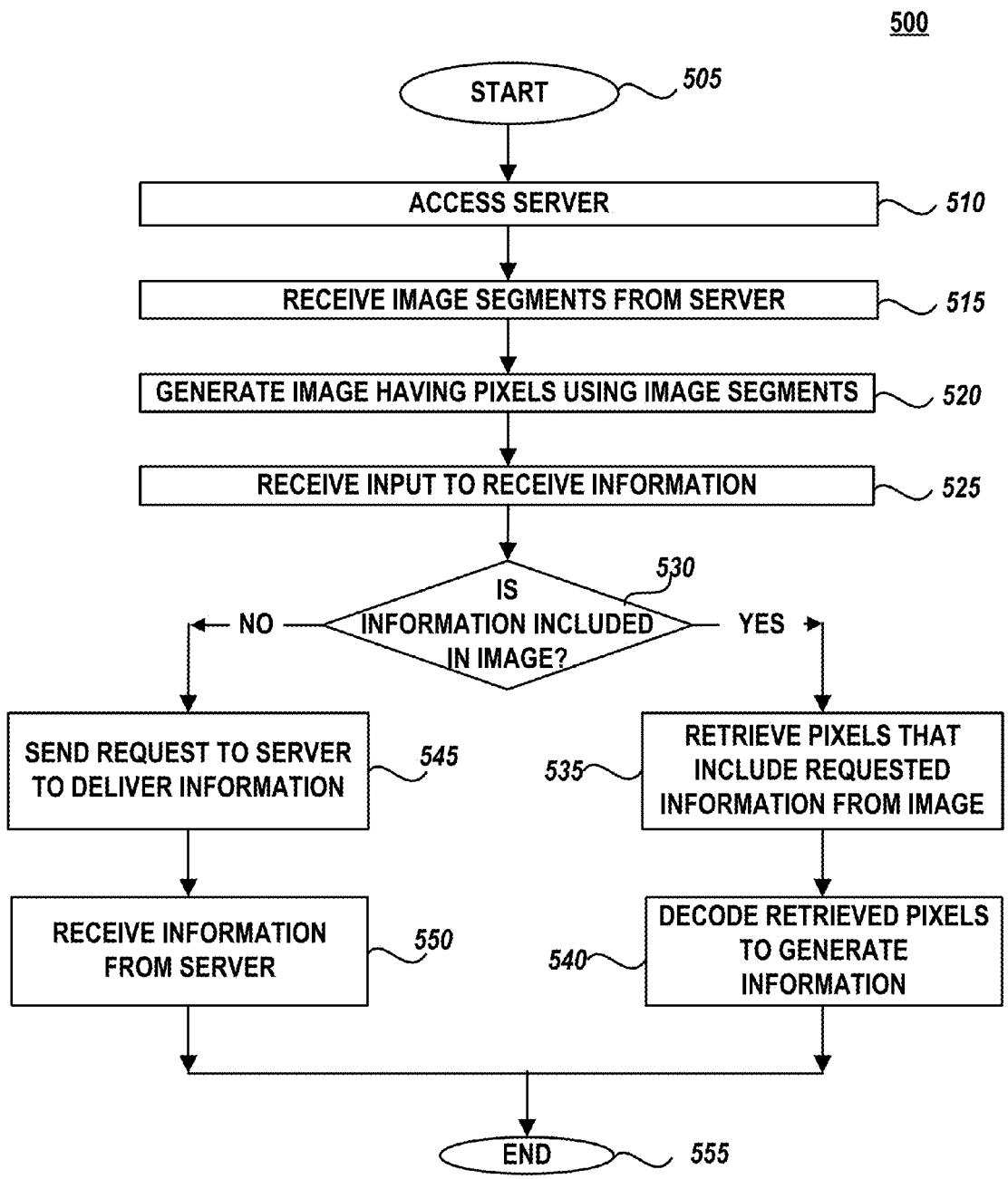
FIG. 5 is a flowchart illustrating operations used by a client device to receive an image with encoded information from a server and to decode portions of the image if requested, in accordance with an embodiment.

FIG. 5 is a flowchart illustrating a process 500 used by a client device 202 to receive an image from a server 232 over the network 104 with information from a document that has been encoded, in accordance with an embodiment. The process 500 begins in operation 505 where the client device 202 is initialized by starting it and logging on so that it is set up to receive and transmit signals to the server 232 via the network 104. In some embodiments, operation 505 is optional and the process starts in operation 510. Operation 505 can be optional if the client device 202 is already running and all the necessary logging on has been performed. In operation 510, the client device 202 accesses a source of content, such as the server 232. In one embodiment the client device 202 accesses the source of content, such as the server 232, by using a browser to search for information on a website housed on the server 232. For example, the server 232 can contain a vendor's catalog that the user searches for purchasing merchandise. In this example, the user uses a browser running on the client device 202 to search the catalog belonging to a website housed on the server 232.

In operation 515, the client device 202 receives image segments from the server 232. Once the client device 202 has accessed the source of content, such as the server 232, the server 232 begins to push down (transmit) to the client device 202 an image having the entire contents of a document encoded, as previously discussed with reference to FIG. 4. The document can be a catalog of a vendor's products or some other document. In operation 515, the client device 202 receives the image segments associated with this image. Next in operation 520, an image comprising pixels is generated using the received image segments. Since it can take some time to receive all of the image segments to generate the image, the image is a partial image until the image is completely generated and becomes a finished image. The amount of time it takes to transmit the image segments depends on the size of the image, which can range from only a few bytes to many megabytes, and how busy the server, network, and client device are. The image segments are received dynamically in the background while other programs are running and other searches are done. The client device 202 continues to receive image segments until all of the packets needed to form the finished image have been received. Similarly, the image is also generated dynamically in the background using the received image segments until the finished image is generated.

Next in operation 525, the client device 202 receives an input from a user at a first time to retrieve a requested information. As the user continues to browse the website housed on server 232, the user continues to conduct searches according to items that the user finds interesting and wishes to explore further. When the user wishes to explore an item further, the user initiates a search by inputting the appropriate parameters into the client device 202. The input is received independently of whether all the image segments needed to generate the image are received and independently of whether the image is the partial image or the finished image. In operation 530, a decision is made whether the information requested by the user via the input to the client device 202 is included in the image generated at the first time independently of whether the image is the partial image or the image is the finished image. If the decision in operation 530 is that the requested information is included in the image, then in operation 535 the pixels from the image that include the requested information are retrieved. Next in operation 540, the retrieved pixels are decoded and the requested information is generated. If the decision in operation 530 is that the requested information is not included in the image, then in operation 545 the client device 202 transmits a request to the server to retrieve the requested information. Next in operation 550, the client device 202 waits to receive the requested information from the server 232 until it receives the requested information in this operation. Since it takes much less time to retrieve and decode the requested information from the image in operations 535 and 540 than to request and retrieve the requested information from the server in operations 545 and 550, the user's browsing experience will be enhanced after the complete image has been received by the client device 202 and there is no need to use operations 545 and 550 to retrieve information.

In operation 555 the process ends after all the requested information has been received and presented to the user. After all the image segments have been transferred to the client device 202, the client device 202 will no longer need to request any more information from the server 232 because it has all of the information that the server 232 would transmit directly available to it locally on the image it has saved. Therefore, after some time the client device 202 will perform operations 545 and 550 if the request to the server is something different than browsing information that was saved on the image. Some examples where the client device 202 would continue to use operations 545 and 550 is when the user decides to purchase something from the website or to retrieve information that was not part of the original document (e.g., not part of the original vendor's catalog).

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and hand held devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response inputs from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch display, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the target information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for delivering information, comprising:

encoding a plurality of webpages from a web server remote to a client device into a first image, the plurality of webpages being associated with a plurality of different types of content categories, the first image comprising a plurality of pixels, the plurality of pixels including binary data that corresponds to a markup language;

parsing the first image into a plurality of secondary images, each of the secondary images of the plurality of secondary images comprising encoded binary data used to generate a set of webpages of the plurality of webpages, wherein the set of webpages is associated with one type of content category of the plurality of different types of content categories;

generating an index relating each of the plurality of webpages to a respective encoding within the plurality of secondary images;

obtaining a first request from a browser of the client device for a first webpage of the plurality of webpages;

retrieving the first webpage from the web server and providing the first webpage to the browser;

transmitting, to the browser, the plurality of secondary images and causing the plurality of secondary images to be lazy-loaded in an image cache of the browser as part of a background process;

obtaining a second request from the client device for a second webpage of the plurality of webpages;

causing the browser to process the index to determine a portion of the plurality of secondary images corresponding to the second webpage;

causing the browser to retrieve the portion of the plurality of secondary images from the cache; and causing the browser to decode binary data associated with the portion of the plurality of secondary images into the markup language to obtain the second webpage.

2. The computer-implemented method of claim 1, wherein at least one of the plurality of webpages further comprises at least one of audio data or video data.

3. The computer-implemented method of claim 1, wherein the plurality of webpages comprises a catalog.

4. The computer-implemented method of claim 1, wherein transmitting, to the browser, the plurality of secondary images is done automatically without receiving a direct request for the plurality of secondary images from a user of the client device.

5. The computer-implemented method of claim 1, further comprising:

transmitting a patch to the browser, wherein the patch is an update to at least one of the plurality of secondary images.

6. A computer-implemented method of receiving information, comprising:

sending, to a remote source, a first request from a browser of a client device for a first portion of content of a set of content;

receiving, to the browser, the first portion of content and a data set from the remote source, the data set comprising a plurality of pixel sets being received and lazy-loaded in an image cache of the browser as part of a background process, each of the plurality of pixel sets corresponding to respective portion of content of the set of content, wherein the data set is associated with a plurality of different types of content categories, each of the pixel sets of the plurality of pixel sets comprising encoded binary data used to generate a portion of content of the set of content, wherein the portion of content is associated with one type of content category of the plurality of different types of content categories, and each of the plurality of pixel sets includes binary data that corresponds to a markup language;

obtaining a second request for a second portion of content of the set of content;

determining, from an index relating portions of content of the set of content to a respective encoding within the plurality of pixel sets of the data set, a pixel set of the plurality of pixel sets corresponding to the second portion of content;

retrieving the pixel set from the plurality of pixel sets of the data set stored in the cache; and decoding the binary data associated with the pixel set into the markup language to obtain the second content.

7. The computer-implemented method of claim 6, further comprising:

determining that the second content is not included in the data set; and sending the second request to the remote source for the second content.

8. A system for delivering information, comprising:

a processor; and a memory device including instructions that, upon being executed by the processor, cause the system to:

encode information remote to a client device into an image, the information including subsets of information, the image including a plurality of pixels that include binary data that corresponds to a markup language;

parse the image into a plurality of portions of the image, each portion of the plurality of portions of the image corresponding to a respective set of pixels of the plurality of pixels;

generate an index relating each subset of information to a respective encoding within the plurality of portions of the image;

transmit the information to a browser of the client device as part of a background process;

cause the browser of the client device to reassemble the information into the image and lazy-load the image in an image cache of the browser;

obtain a request for a specific subset of the information;

cause the browser to process the index to determine, from the image stored in the cache, a portion of the image of the plurality of portions of the image corresponding to the specific subset of the information, the portion of the image corresponding to a first set of pixels;

cause the browser to extract the first set of pixels from the image stored in the cache; and cause the browser to decode binary data associated with the first set of pixels into the markup language to obtain the specific subset of the information.

9. The system of claim 8, wherein the information comprises one or more documents.

10. The system of claim 9, wherein the one or more documents comprise a catalog.

11. The system of claim 8, wherein the instructions that cause the system to transmit the data set to the browser further cause the system to:

transmit the data set automatically without receiving a direct request for the data set from a user of the client device.

12. The system of claim 8, wherein the memory comprises instructions when executed to further cause the system to:

transmit a patch to the browser, wherein the patch is an update to the image.

13. A client device for receiving information, comprising:

a processor; and a memory device including instructions that, when executed by the processor, cause the client device to:

send a first request from a browser of the client device for a first portion of content of a set of content located at a remote source;

receive, to the browser, the first portion of content and a plurality of image segments from the remote source, lazy-load the plurality of image segments in an image cache of the browser as part of a background process;

generate a primary image using the plurality of image segments, the primary image comprising a plurality of pixel sets each corresponding to respective portion of content of the set of content, the plurality of pixels sets including binary data corresponding to a markup language;

obtain a second request for a second portion of content of the set of content;

determine, from an index relating portions of content of the set of content to a respective encoding within the plurality of pixel sets of the primary image, a pixel set of the plurality of pixel sets corresponding to the second portion of content;

retrieve the pixel set from the plurality of pixel set of the primary image stored in the cache; and decode binary data associated with the pixel set into the markup language to obtain the second content.

14. The client device of claim 13, wherein the instructions that cause the system to decode the pixels comply with ECMA-262 Edition 5 standard or a variation thereof.

15. A non-transitory computer-readable storage medium storing instructions for delivering information, the instructions when executed by a processor causing the processor to:

encode information remote to a client device into an image comprising a plurality of pixels, the information including subsets of information, the subsets of information being associated with a plurality of different types of content categories, each subset of the information corresponding to respective content;

generate an index relating each subset of the subsets of information to a respective encoding within the image;

generate a plurality of image segments, each image segment of the plurality of image segments comprising encoded binary data used to generate a subset of information of the subsets of information, wherein the subset of information is associated with one type of content category of the plurality of different types of content categories, each image segment of the plurality of image segments comprising a portion of the image and a set of pixels that include binary data corresponding to a markup language;

transmit the plurality of image segments to a browser of the client device;

cause the browser to reassemble the plurality of image segments into the image to be lazy-loaded in an image cache of the browser;

obtain a request for the specific subset of the information;

cause the browser to process the index to determine a first set of pixels of the set of pixels corresponding to the specific subset of the information; and cause the browser to decode binary data associated with the first set of pixels into the markup language to obtain the specific subset of the information.

16. The non-transitory computer-readable storage medium of claim 15 wherein the information comprises one or more documents.

17. The non-transitory computer-readable storage medium of claim 16 wherein the one or more documents comprise a catalog.

18. The non-transitory computer-readable storage medium of claim 15, wherein the instructions that cause the processor to transmit the plurality of image segments to the browser further cause the processor to:
  transmit the plurality of image segments automatically without receiving a direct request for the plurality of image segments from a user of the client device.

19. The non-transitory computer-readable storage medium of claim 15, wherein the instructions when executed further cause the processor to:
  transmit a patch to the browser, wherein the patch is an update to the image.

20. A non-transitory computer-readable storage medium storing instructions for receiving information, the instructions when executed by a processor causing the processor to:
  send a first request from a browser of a client device for a first portion of content of a set of content to a remote source;
  receive to the browser the first portion of content and a plurality of image segments from the remote source;
  lazy-load the plurality of image segments in an image cache of the browser as part of a background process;
  generate a primary image using the plurality of image segments, the primary image comprising a plurality of pixel sets each corresponding to respective portion of content of the set of content, the plurality of pixel sets including binary data corresponding to a markup language;
  obtain a second request for a second portion of content;
  determine, from an index relating each of the plurality of pixel sets to a respective encoding within the primary image, a pixel set of the plurality of pixel sets corresponding to the second portion of content;
  retrieve the pixel set from the primary image stored in the cache of the browser; and
  decode binary data associated with the pixel set into the markup language to obtain the second portion of content.

21. The computer-readable storage medium of claim 20, wherein the instructions that cause the processor to decode the pixel set comply with ECMA-262 Edition 5 standard or a variation thereof.

* * * * *